United States Patent
Alharayeri

(10) Patent No.: US 9,264,875 B2
(45) Date of Patent: *Feb. 16, 2016

(54) LOCATION-BASED DISCOVERY OF NETWORK MEMBERS BY PERSONAL ATTRIBUTES FOR ALTERNATE CHANNEL COMMUNICATION

(71) Applicant: XIMOXI, INC., Los Gatos, CA (US)

(72) Inventor: Ramzi Alharayeri, San Jose, CA (US)

(73) Assignee: WIRELESS DISCOVERY LLC, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,779

(22) Filed: Dec. 15, 2014

(65) Prior Publication Data
US 2015/0099550 A1    Apr. 9, 2015

Related U.S. Application Data

(63) Continuation-in-part of application No. 12/351,654, filed on Jan. 9, 2009, now Pat. No. 8,914,024.

(60) Provisional application No. 61/010,891, filed on Jan. 10, 2008.

(51) Int. Cl.
*H04W 24/00* (2009.01)
*H04W 4/20* (2009.01)
(Continued)

(52) U.S. Cl.
CPC ............... *H04W 4/206* (2013.01); *H04L 51/00* (2013.01); *H04L 51/32* (2013.01); *H04L 65/00* (2013.01);
(Continued)

(58) Field of Classification Search
CPC .......................... H04W 4/02; H04L 29/08657
USPC ............ 455/41.2, 412.2, 414.1, 426.1, 432.3, 455/434, 456.3
See application file for complete search history.

(56) References Cited

U.S. PATENT DOCUMENTS 6,178,511 B1    1/2001    Cohen et al.
6,243,816 B1    6/2001    Fang et al.
(Continued)

FOREIGN PATENT DOCUMENTS

DE         10149496 A1     4/2003
EP          1450282 A2     8/2004
WO        PCTUS0930756     1/2009

OTHER PUBLICATIONS

Malley, A., "Apple seeks distance-based pairing, auto contact data patents," Webpage: http://appleinsider.com/articles/08/09/27/apple_seeks_distance_based_13 pairing_auto_contact_data_patents, published on Sep. 27, 2008, 2 pages.

*Primary Examiner* — Christopher M Brandt
*Assistant Examiner* — Matthew Genack
(74) *Attorney, Agent, or Firm* — Rahman LLC

(57) ABSTRACT

User mobile devices are equipped to discover each other through an ad hoc network, based on their location and proximity or based on mobile network reporting to one another. Locations may be reported through global positioning methods and cross-referenced by other users. Following discovery and consent, the mobile devices are connected to one another via various means, other than the ad hoc network, and utilize functions provided by services such as SMS, E-mail, chat/instant messaging, multimedia, or video. The users may be members of a common social network, and can thereby exchange social network attributes.

20 Claims, 15 Drawing Sheets

(51) Int. Cl.
*H04L 29/08* (2006.01)
*H04L 12/58* (2006.01)
*H04L 29/06* (2006.01)
*H04W 4/02* (2009.01)
*H04W 76/00* (2009.01)
*H04W 84/18* (2009.01)
*H04L 29/12* (2006.01)

(52) U.S. Cl.
CPC ............ *H04L 67/28* (2013.01); *H04L 67/306* (2013.01); *H04W 4/023* (2013.01); *H04W 76/00* (2013.01); *H04L 51/38* (2013.01); *H04L 61/1594* (2013.01); *H04W 84/18* (2013.01)

(56) References Cited

U.S. PATENT DOCUMENTS

| | | | |
|---|---|---|---|
| 7,249,182 B1 | 7/2007 | Heinonen et al. | |
| 7,296,036 B2 | 11/2007 | Celik | |
| 7,310,515 B2 | 12/2007 | Enderlein et al. | |
| 7,346,855 B2 | 3/2008 | Hellyar et al. | |
| 7,353,462 B2 | 4/2008 | Caffarelli | |
| 8,472,874 B2 | 6/2013 | Tang et al. | |
| 8,606,854 B2 | 12/2013 | Serlet | |
| 2004/0009750 A1 | 1/2004 | Beros et al. | |
| 2004/0113807 A1 | 6/2004 | Amram et al. | |
| 2005/0026594 A1 | 2/2005 | Miller et al. | |
| 2005/0076124 A1 | 4/2005 | Enderlein et al. | |
| 2005/0193093 A1* | 9/2005 | Mathew | G06F 21/62 709/219 |
| 2005/0281237 A1 | 12/2005 | Heinonen et al. | |
| 2006/0063548 A1 | 3/2006 | Kim | |
| 2006/0234631 A1 | 10/2006 | Dieguez | |
| 2007/0021111 A1 | 1/2007 | Celik | |
| 2007/0167136 A1 | 7/2007 | Groth | |
| 2007/0168425 A1 | 7/2007 | Morotomi | |
| 2007/0242814 A1 | 10/2007 | Gober | |
| 2007/0260751 A1 | 11/2007 | Meesseman | |
| 2008/0051033 A1 | 2/2008 | Hymes | |
| 2008/0108308 A1* | 5/2008 | Ullah | G06Q 30/02 455/41.2 |
| 2009/0209202 A1* | 8/2009 | Martini | H04W 12/02 455/41.2 |

\* cited by examiner

1- Stationary device 1504 detects user 1502 in vicinity via short range ad hoc signal.
2- Stationary device 1504 components are wireless short range technology for detection + Computing device. Or wireless technology component that is connected wired or wirelessly to a computing device
3- Stationary device connected to sever 1506 via wireless signal to report 1502 presence.

LOCATION-BASED DISCOVERY OF NETWORK MEMBERS BY PERSONAL ATTRIBUTES FOR ALTERNATE CHANNEL COMMUNICATION

RELATED APPLICATIONS

This application is a continuation-in-part of U.S. application Ser. No. 12/351,654, filed on Jan. 9, 2009, which claims benefit to U.S. Provisional Application No. 61/010,891 filed on Jan. 10, 2008, the contents of which are incorporated by reference herein in their entirety.

FIELD OF INVENTION

The invention relates to discovering members of a social network by associating their personal attributes to the mobile device for the purpose of exchanging information using mobile communication devices and, in particular, exchanging personal information between one or more mobile communication devices.

DESCRIPTION OF RELATED ART

In light of the explosive use of mobile devices, social networks and email addresses, individuals are in need of the ability to exchange customized information such as pictures, social network profiles, emails and phone numbers using their mobile devices.

There are methods to exchange contact information in the form of Vcards. But there is no form of communication using mobile devices that allows discovery by personal attributes for the purpose of exchanging contact information. Furthermore, there is no available technology adapted for allowing mobile device users to easily exchange contact and/or related personal information over the internet for the purpose of social interaction by way of mobile devices.

Some available methods for contact information exchange do not provide discovery by attributes. Rather, these methods assign pin numbers to individuals or offer discovery by a mobile class or mobile ID. Typically, these systems require a user to operate under a common telecommunication service provider operated network. Other methods are based on Bluetooth technology in an ad hoc mode between two devices. These methods usually work only on the same brand mobile devices due to Bluetooth technology limitations, compatibility and security issues.

Communication between two Bluetooth-enabled devices typically requires entering a passkey or security code to allow pairing or communication between any two devices. This desire for maintaining security/privacy, inherent in the design of existing Bluetooth-enabled devices, such as a Smartphone, has imposed undesirable limitations on mobile device users who wish to interact with each other in a social setting.

Other alternatives available for contact information exchange such as Beam technology permit the exchange to take place between similar mobile devices using an infrared signal. This particular solution is, however, limited. For example, it requires a line-of-sight between the devices and does not offer the ability to exchange information such as pictures as a personal attribute and limits the use to a similar brand of hardware transmitting in an ad hoc mode.

U.S. Pat. Nos. 7,454,004; 7,450,966; 6,868,451; 7,440,746; and 7,249,182 focus on contact information storage, retrieval, Bluetooth methods of profiles and exchange of contact information in an ad hoc method.

SUMMARY OF THE DISCLOSURE

In certain embodiments, the invention is directed to a system and method that allows individuals to use their mobile phones to discover others by personal attributes, such as by photos and names, after which, the two parties can exchange information over the internet by bypassing the inherent limitations of existing Bluetooth technology, e.g., security/privacy limitations and compatibility issues that limit or prohibit ad hoc communication, such as when mobile devices of different brands attempt to communicate with each other. In another sense, where there is interference making it difficult to communicate via Bluetooth, WiFi, etc., there is a system disclosed that provides an alternative pathway, network, communication link, etc. available through a cellular phone network, Ethernet or similar wired or wireless connection that is available in the event the local ad hoc network becomes unavailable after initial discovery of an address or other unique identifier for a mobile device.

In one aspect, the invention provides a system and method that enables free discovery of others who also desire social interaction, but without being constrained by hardware compatibility issues inherent in mobile devices by different manufacturers. According to this aspect of the invention, mobile device users (or users) can offer to other, nearby users, their pictures or other information as part of a discovery process, save contacts received from other users, and keep contacts stored on a mobile device up to date by upload/download of personal information through a networked storage device, e.g., an internet-linked storage device accessible through a cellular phone network. The storage device can be configured to frequently push updates of a user's contacts to his/her mobile device. Additionally, the network link with the storage device may be configured to initiate an exchange of photos and other contact information (via access to the network storage) after initial discovery has occurred between users over a Bluetooth-enabled communication link, such as a Bluetooth user's Personal Area Network (PAN).

According to the invention, a process of discovery and exchange of contact information may provide the mobile device user (or users) with an experience of exchanging highly personal information with someone nearby, after that person has been discovered using existing standard Bluetooth technology, but without the need to reprogram or adapt a standard cell phone to permit exchanges of personal information over, e.g., a PAN, such as pictures or a VCard level of personal information. Thus, the invention offers the advantage of not being limited to similar mobile devices, and capable of being implemented on almost any type of mobile communication device, e.g., a standard cell phone, since the personal information exchange does not occur via direct communication between the mobile devices, although the user has this type of experience when socializing since there can be a nearly real time exchange of personal information with someone whom he/she has just discovered over a PAN, or a WiFi network, for example.

It should be noted that while the invention is described as implemented using Bluetooth technology and a Bluetooth-type PAN (Personal Area Network), this is for convenience only and it will be understood that the invention is not limited to Bluetooth, such as the Bluetooth Specification V 2.1+EDR (Enhanced Data Rate) or subsequent derivatives of Bluetooth specifications such as Bluetooth 4.1 and BLE "Bluetooth low Energy" and so forth. Other wireless technologies can be used, including, but not limited to, cellular technology, Wi-Fi, Wi-Max, IEEE 802.11 technology, radio frequency (RF) communications, Infrared Data Association (IrDA) compatible protocols, Local Area Networks (LAN), Wide Area Networks (WAN), and Shared Wireless Access Protocol (SWAP), and Personal Area Networks (PAN).

For purposes of explanation, the following definitions are adopted. A "requesting user" is the person or person(s) who, using a Bluetooth-enabled (that is, more generally, wireless-enabled, as defined above) mobile device, initiates a discovery process, e.g., search for other Bluetooth-enabled devices within a PAN, and a "discovered user" is the person or person(s) having a Bluetooth enabled device that are discovered by the requesting user.

In one example, two persons, a requesting user and discovered or discoverable user are members of a social network that allows the members to communicate with each other over the internet. The network includes a server that stores personal attribute information. A standard Bluetooth discovery process may be initiated by the requesting user. The discoverable user member is discovered, e.g., when the requesting user's mobile device receives a Bluetooth address. Then this address is communicated to the server, and in response the server sends a picture and name, or other information, of the discoverable user to the requesting user. The requesting user's next requests that the server transmit his/her customized invitation or electronic card to the now discovered user. The communication between requesting/discovered users may then proceed by accessing information located over network storage, thereby bypassing the limitations of communication using the Bluetooth protocol. The Bluetooth protocol, in this example, is used to locate someone nearby. But after this discovery, the requesting and discovered users thereafter communicate over the internet. The subsequent interaction may include an exchange of VCards or similar electronic coordinates, SMS or other forms of real-time communication that may be facilitated by the same service that connected the two users to each other, or by a third party service.

According to another aspect of the invention, there is a system and method that allows users of a social network, or more generally database service, to create custom social cards that include social profiles, emails, phone numbers and/or a picture as a personal attribute. In one embodiment, a custom social card associated with the discovered user may be received when a requesting user discovers another member of the service, rather than an uninteresting Bluetooth address or serial number. For instance, the social card may include a picture and a name, personalized icons or card designs, etc. Furthermore, the requesting user may collect a plurality of such social cards when there are many members of the service within the short range network or vicinity, or geographic area as defined by the user who is conducting the search. The social cards are received from the server in response to the requesting user's mobile device uploading mobile device attributes associated with other members of the social network, group or service. If the requesting user elects to make contact with one or more of the members, he/she may send an invitation containing a picture of the requesting user with a personalized message intended to spark an interest in the discovered user. The discovered user may then respond by sending his/her own custom social card, or reject the invitation.

The system includes a network-linked storage facility that collects information provided by members of a group, e.g., members of a social network, along with personal attributes in a data base hosted by a centralized computer with internet connection. The system associates a member's, e.g., phone ID to the member's account/profile. The phone association takes place when the user downloads a client-side application which collects, among other things, a unique phone characteristic such as a Bluetooth address or serial number.

In accordance with one or more of the foregoing objectives, the invention may be implemented to allow mobile device users to discover other members of the same database service, e.g., a social network, within a vicinity covered by short range wireless networks such as Bluetooth but without being limited by the shortcomings of the Bluetooth or related short range telecommunication standards and/or related hardware incompatibilities. The members can elect to exchange or send personalized, intimate contact information over the internet after the users have discovered each other, thereby bypassing short range security/privacy barriers and/or hardware compatibilities between mobile communication devices from different manufacturers. Hence, the invention enhances and facilitates the sharing of contact information between mobile users. The invention leverages available technology and standard protocols available today such as Bluetooth technology and defined standards within the Bluetooth technology such as Vcard profile and OBEX.

As mentioned earlier, all of the presently known, existing technology for communicating over short range, e.g., infrared or Bluetooth, focus on pushing contact information from one device to another. According to another aspect of the invention, there is a bidirectional exchange of contact information allowing receiving and sending at the same time. There is no slave/master relationship, which is common to all current existing contact exchange technologies between mobile devices.

The invention fills a gap left by the existing standards and technologies when it comes to the actual discovery process and exchange of contact information over the internet by bypassing ad hoc communication and compatibility issues.

According to another embodiment a system for exchanging personal information between a first user and second user includes a server accessible through the internet, the server providing access to stored user profile information about the first and second users including personal attribute information and mobile device addresses; searching, using a first device, for the presence of other mobile devices within the vicinity of the first device using the short range communication protocol, whereupon discovery of a second device the first device receives a unique, identifying attribute of the second device the first mobile device sending from the first device to the server the received identifying attribute for the second device; the server sending to the second device, via the server, an invitation to accept personal information from, or share personal information with the first user, wherein the invitation includes a graphics file associated with the first user's personal attribute information; and the second mobile device accepting or rejecting using the second device the invitation from the first device.

According to yet another embodiment a method for requesting an exchange of personal information using a mobile communication device comprises the steps of: searching for the presence of other mobile devices within a personal area network; receiving a mobile device attribute from one or more nearby mobile devices; and sending one or more of the received mobile device attributes to a server located on the internet, the server being responsive to receipt of the one or more mobile device attributes for transmitting personal information about a respective one or more persons associated with the mobile device attributes received by the server.

According to yet another embodiment, a system for exchanging information among members of a group, such as members of a social network service, includes an internet-based server having a registration portion. After a user has registered online with the service, the server downloads a client-side application to the mobile device. A registration process is complete when a user receives a copy of a customized social card. And the user may thereafter transmit his/her social card to devices identified over a local network, such as a PAN, or to devices in the vicinity whose location was reported to the server as being close to the first user; or in the geographic area specified in the first user search criteria; or reported in the users database as members in the same vicinity/address/geographical vicinity, wherein, in certain embodiments, those devices/users are also members of the social network of the searching user.

According to another aspect of the invention, there is a method for meeting people including discovering people, e.g., over an ad hoc network, personal area network, etc., viewing their pictures, names, or other personal information, and selecting one or more people to send an invitation. The invitation may take the form of a social card, VCard, or other manner of engaging another person in a social atmosphere, or even a business setting such as a meeting, trade show, conference, etc.

According to another aspect of the invention, there is a method for discovering a person over a first network, and then communicating with that person over a second network after obtaining an electronic coordinate, e.g., a Bluetooth ID address, of the person. The first network can be a Personal Area Network (PAN) and the second network can be a cellular phone network. The method may further include the step of selecting and exchanging information based on pictures received at each of two or more mobile devices based on a mobile phone ID indexing/cross reference at a network server. The mobile device users can be members of a service that operates/maintains the server. The method may further include contacting each mobile user by a message that is presented to the user by a picture displayed on, and selectable by a mobile phone, the picture being sent by a server responsive to a received mobile phone ID or Bluetooth address.

According to another embodiment, a server is capable of providing a communication between a first and second mobile phone user based on receipt of mobile phone identifier, the server communicating via a cellular phone network and the mobile device identifiers being discovered over a PAN or similar local ad hoc network. The server is capable of providing information to phones not capable of exchanging data via Bluetooth or the related ad hoc network communication protocol, and/or not connected to a cellular phone network via a common cellular phone network provider, or provider plan. In certain embodiments, unique ad hoc network identifiers comprising a Bluetooth device address, a WiFi address, or main component address such as IMEI which is the international Mobile Station Equipment identify are exchanged between the devices via the server.

According to another aspect of the invention, there is a method for discovering a person over a first, one-directional network, and then communicating with that person over a second, bi-directional network after obtaining an electronic coordinate, e.g., a Bluetooth address, of the person. The first network can be a Personal Area Network (PAN) and the second network can be a cellular phone network. The one directional network can conduct the discovery utilizing a communication medium having a master-slave relationship, as understood in the art, while the second network can operate by utilizing a network based storage for receiving and responding to requests to send or receive information form each side of the communication, e.g. bi-directional communication between a first and second mobile device.

In accordance with certain embodiments, a system includes a discovery device connected to a short range wireless communication protocol through an ad hoc wireless network which is connected to local computing machine that is connected to the internet and providing connection to a server. The server is configured to communicate for detecting first user presence in vicinity through the discovery device and local computing machine, the first user using a respective first mobile communications device and the discovery device is equipped with short range wireless technology each capable of connecting to the server through an internet connection and each also connected to the short range wireless communication protocol through the ad hoc wireless network. The server is in communication with the internet, and configured to provide access to stored user profile information and preferences of the first user, respectively, including personal attribute information and a mobile communications device address. The server is configured to receive, from the first mobile communications device or from the discovery device, a received unique ad hoc network identifier for the first mobile communications device received, by the discovery device, from the discovery device in response to a search for users in vicinity using the short range communication protocol for the presence of the first mobile communications device on the ad hoc network. The server configured to receive, from the discovery device, the unique ad hoc network identifier of the first mobile communications device and to send to local computing equipment instructions based on user preferences. The local computing device is capable of connecting to other local devices via wireless signal and can control functions. Example of other wireless local devices that maybe connected to the local computing device would be a wireless light controller device, a wireless temperature controller device, and or wireless home security controller device, using the unique ad hoc network identifier, the server which is connected to the local computing device, confirms the first user identity and personal attributes. This can be a onetime event and requires that local computing device stores match between first user unique ad hoc identification, or can be a function required each time the local computing machine detects a unique ad hoc id identifier. Upon receiving confirmation of first user attributes, the local computing device can execute commands based on first user preferences such as instruct lighting device to turn on/off/dim or connect to temperature control device to adjust temperature.

In accordance with certain embodiments, a method includes providing, via a local computing device, accessible internet and connection to server, access to stored user profile information about a first user using a respective first mobile communications device, receiving, via the computing device, from the stationed discovery device, a received unique ad hoc network identifier for the first mobile communications device, received by the first mobile communications device from the discovery device using the short range communication protocol on the ad hoc network, sending, via the computing device, to the other controlling network devices in vicinity, using wireless network, instruction based on first user preferences.

In accordance with certain embodiments, a local device is equipped with short range wireless technology capable of searching for members of the social network in the vicinity and receive from mobile devices unique ad hoc identifier. The local device has wired or wireless connection to the internet and configured to connect to a server, or other service applications that has access to the server and the first user personal attributes. The local device is capable and programmed to perform regular timed searches for members in the vicinity.

And upon identifying members such as First user, the discovery device cause the computing device to perform a method. In certain embodiments, the method includes connecting to the server via internet connection and reporting to the server the first user presence in the vicinity; connecting to other wireless devices in the vicinity to execute functions based on first user preferences such as unlock door, turn lights on, or adjust temperature.

In accordance with certain embodiments, a method includes the use of a computing device that is capable or reporting to the server that specific function were indeed executed based on first user preferences and the server can update profile information accordingly, and may or may not share this information about the first user presence and functions executed to other social network members who are connected to the first user.

In accordance with certain embodiments, a device that is equipped with short range wireless technology, and computing capabilities and is capable of connecting to the internet via a wireless signal or mobile service, the device operable to detect user presence in its vicinity by obtaining a unique ad hoc identifier of the user in the vicinity, the device, upon detecting said user, operable report same to a computing machine to thereby cause the computing machine to:

provide through a wireless network or mobile telecommunications provider network, access to a stored user profile information about a first user by way of a first mobile communication device associated with the first user, and provide a wired or wireless connection to other devices in the vicinity of the first user to execute functions based on saved personal preferences of the first user.

According to certain embodiments, the executed functions are selected from a temperature adjustment, a light activation, or a door lock control.

INCORPORATION BY REFERENCE

All publications, patent applications or patents mentioned in this specification are herein incorporated by reference to the same extent as if each individual publication or patent application was specifically and individually indicated to be incorporated by reference.

DETAILED DESCRIPTION

According to one aspect of the disclosure, mobile device users sign up, or register with a service that enables the exchange of personal information through a network-based server. After a user provides mobile device information and a phone number, an internet-based centralized computer system (hereinafter "Server") sends to the mobile device a notification via SMS (Short Messaging Service). The SMS message, also known as a text message, alerts the new user to click on an internet link to install the service provider's client-side application on his/her mobile device. Of course other procedures for loading the client-side application onto the user's mobile device can be used, and the SMS message modality is not to be construed as a limitation.

Figure 1:
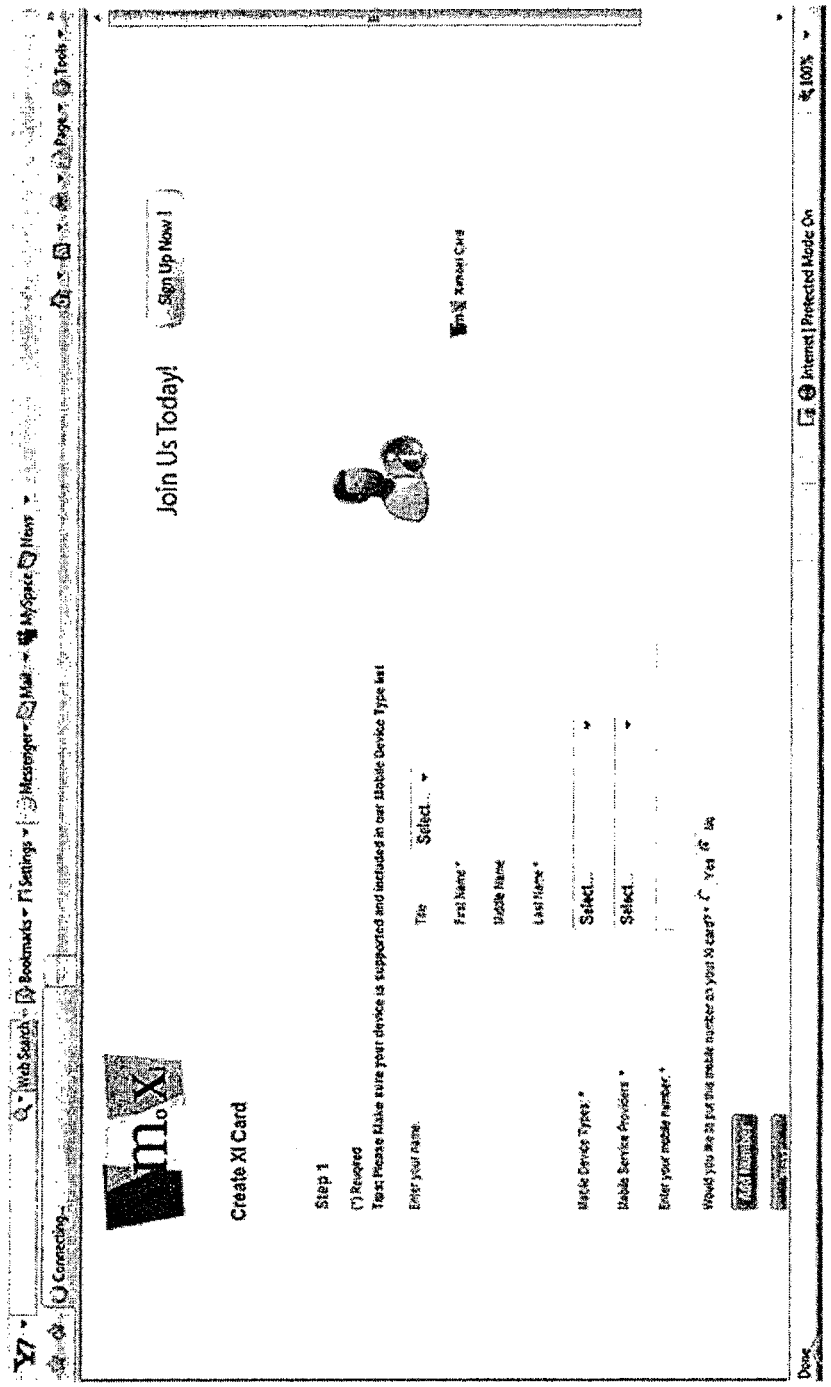
FIG. 1 depicts a computer generated display for registering with a service. This service may provide a user with a network-based storage for personal contact information, creation of a custom social card to send to discovered, or requesting, users who are also members of the service, to provide personal contact information to other users and for accessing personal contact information of other users of the service. The service may be part of a social network.

The user provides information by filling out an on-line profile, including uploading graphics or pictures. An example of a computer generated sign-up screen is shown in FIG. 1. Additional aspects of the registration process include creating a social card, which is intended to be sent to discovered users with whom the user wishes to communicate, and/or to a requesting user upon being discovered, e.g., via a Bluetooth communication protocol or the other technologies delimited above.

As mentioned above, the registration process also includes download of the client-side application (CSA); it resides on the mobile device, is enabled to communicate directly with the service, e.g., to synchronize/update addresses, access account information via username/password, or phone ID, send requests for information about users, send invitations, accept, exchange deny requests for exchange of information, obtain instances of the server addresses, etc. The registration process may be completed when the mobile device receives the customized social card through the resident CSA. Additional aspects of the possible functionalities of the client side application are provided below. Personal and other user information can also be added by way of the CSA for storage on the server, including hobbies, business associations, or personal information as examples. This and other information can also be added for storage on the server means other than the CSA, such as the user's personal computer, a dedicated kiosk, or other means for accessing the server through the internet.

Figure 4:
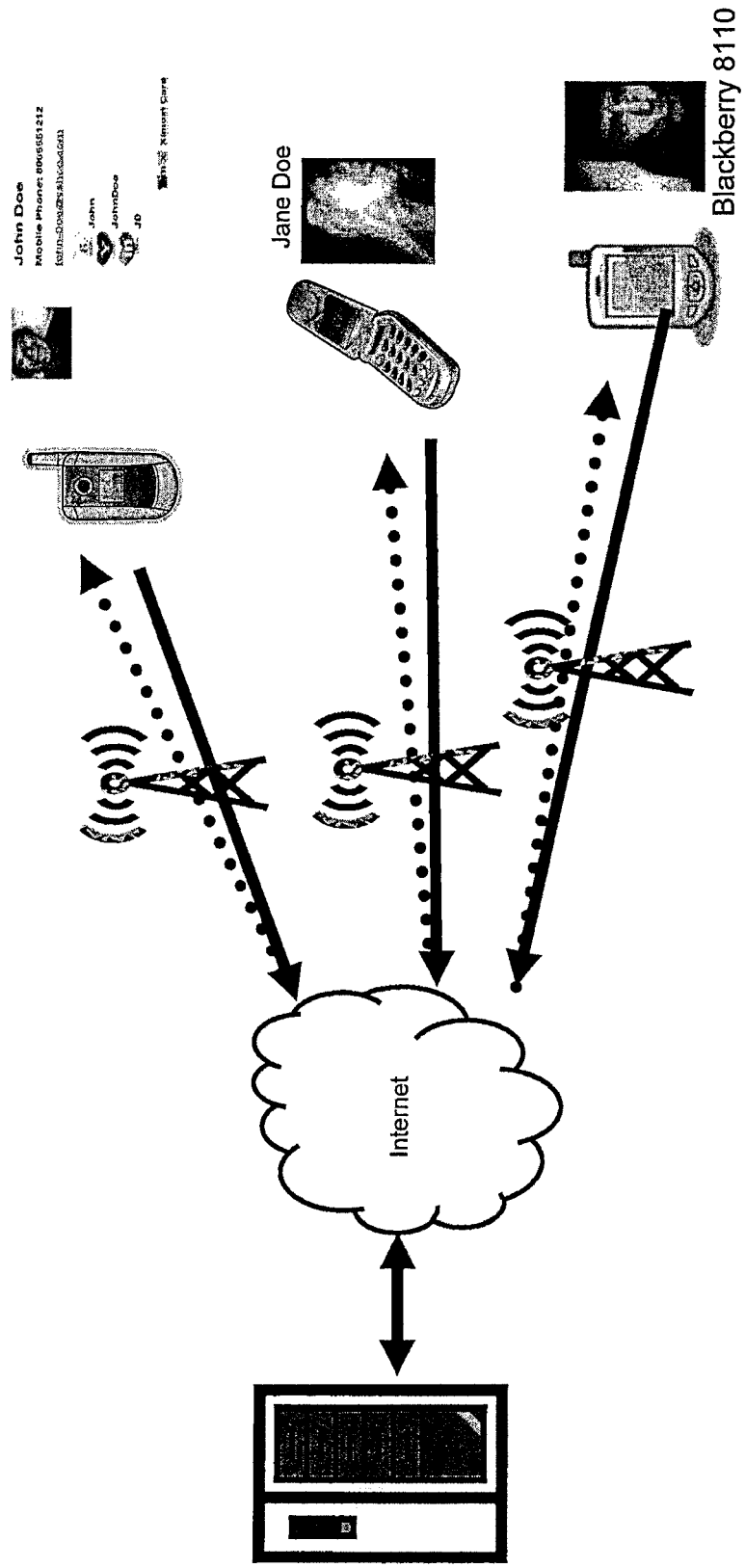
FIG. 4 depicts communication links to/from mobile devices and a network-based server, e.g., internet server, over a Cellular Base Transceiver Station (BTS) using standard communication protocols that provide separate facilities for transmission of digital data. As depicted, the mobile devices may communicate by sending pictures of users associated with the device during a discovery process, as facilitated by the server.

Preferably, in order to take advantage of the functionalities provided by the service, the member of the service ("member") should have a mobile communication device that provides separate facilities (besides voice transmission) for transmitting digital data. This allows a mobile phone to act like any other computer over the Internet, sending and receiving data via the Internet Protocol. FIG. 4 illustrates how communication between mobile users and the Server is conducted. In certain embodiments, communication between the member's mobile devices and the server goes through a Cellular Base Transceiver Station (BTS), and communicates according to a packet-based telecommunications protocol such as GPRS, 3G or any alternative data technology.

Hereinafter the short range communication network used in the examples will primarily be described in terms of the Bluetooth standard. However, as explained above, it should be remembered that other forms of short-range communication may instead be used, e.g., WiFi.

Figure 2:
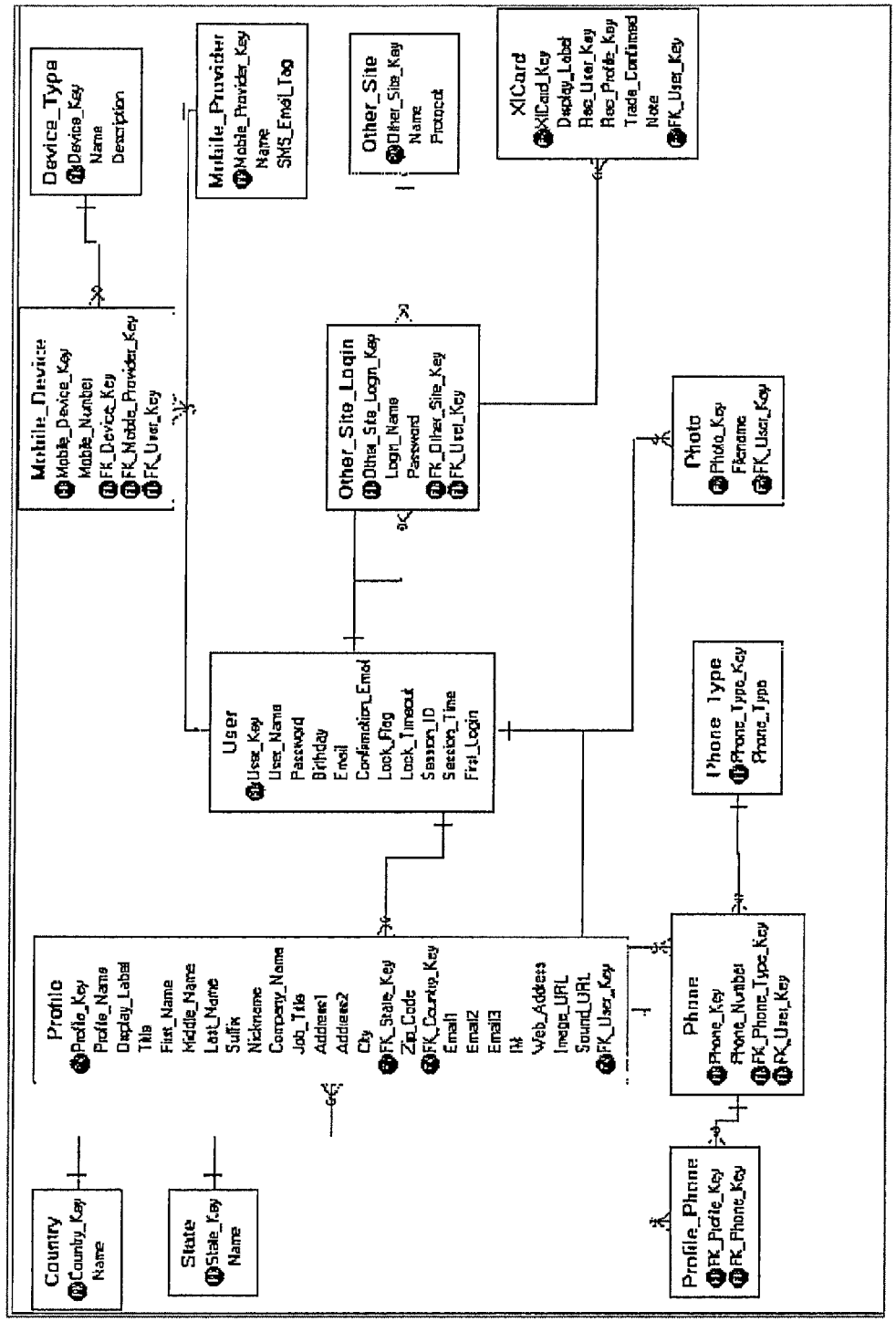
FIG. 2 depicts a database schema/structure for maintaining personal information about a user (member) registered with the service. The information about the member may include, for example, his/her mobile device attributes such as the device key, mobile telecommunications provider; the mobile device type; the member's profile, e.g., name, address, etc.; stored photo(s) of the user; country/state where the member resides; and other information.

One format for storing information about a user/member of the service is shown in FIG. 2. Depicted herein are some of the types of user information that may be stored and made accessible to the user at the server. Users may provide personal attributes such as name, address, and a picture. Information about the user's mobile device may include the make, model, and phone number.

The service provided to users may be operated/accessible under a centralized computer system ("server"), which may include three components: 1) Graphical user interface, providing an interface to members of the network to sign up, input/edit profile information, etc. 2) A scripting language designed for producing dynamic web pages such as PHP. This is a middle layer scripting that manages programming commands. 3) A comprehensive data base that includes user's information, for example as discussed above and shown in FIG. 2.

Figure 3:
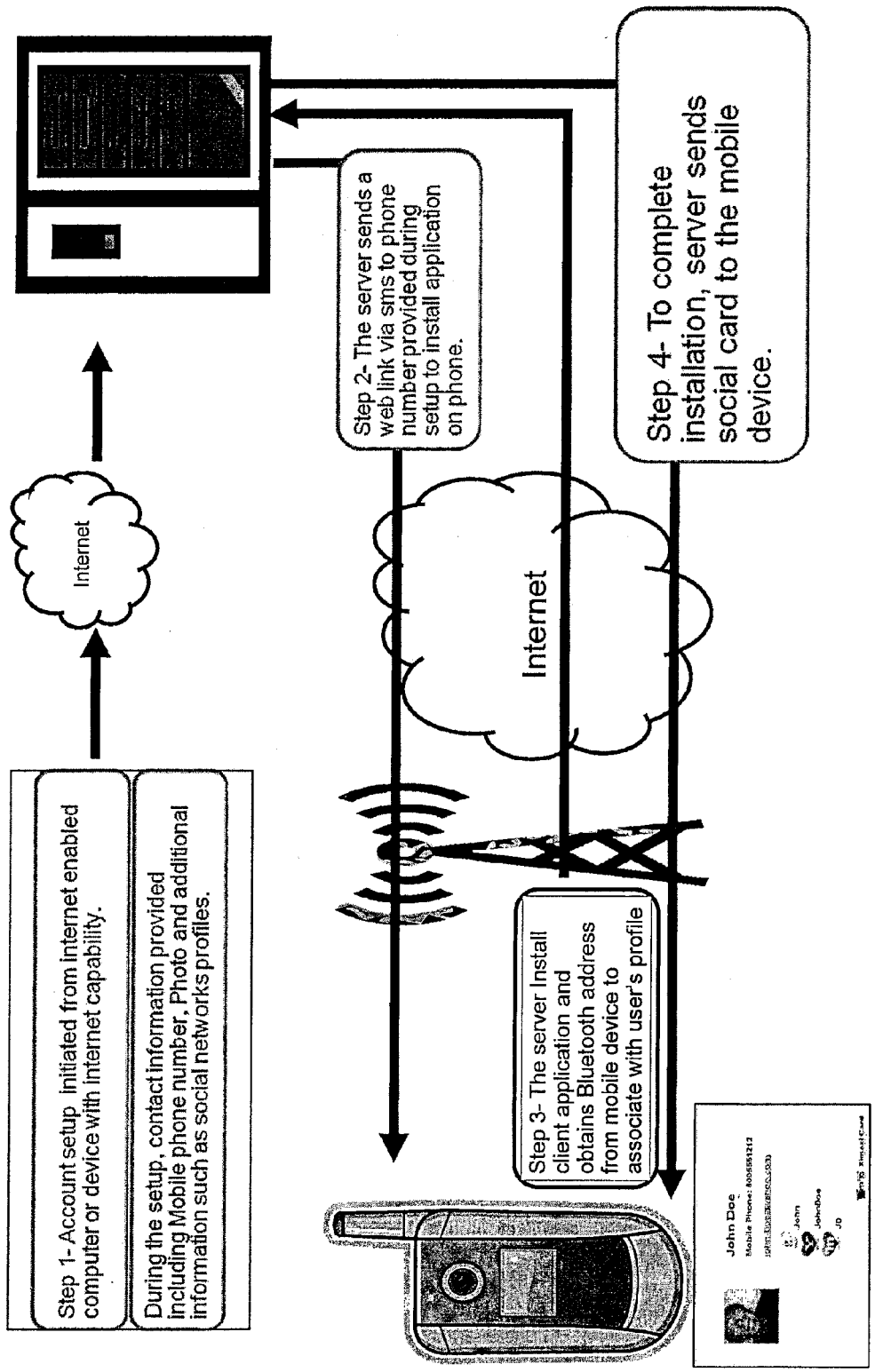
FIG. 3 is a flow chart associated with the creation of a social card for sending to requesting and/or discovered users.
Figure 5:
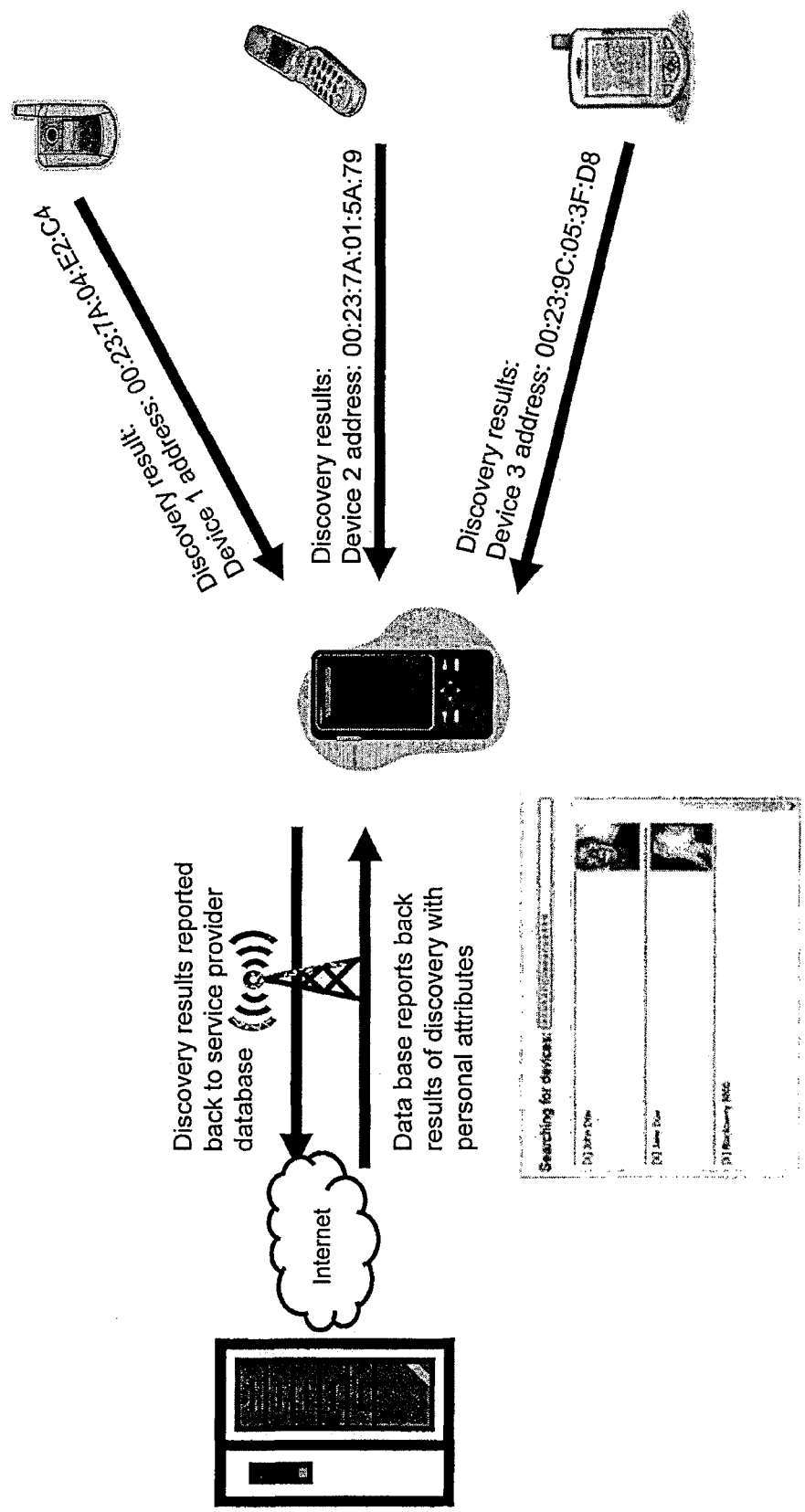
FIG. 5 illustrates a discovery process flow chart between a requesting user and three discovered users.

FIG. 3 is a flow chart depicting a process for registering with the service:

Step 1: Account set up and information provided through a web-based User Interface, e.g., such as shown in FIG. 1;

Step 2: The Server sends an SMS with URL link for download of the CSA;

Step 3: The CSA collects characteristics from the mobile device such as a Bluetooth address for the purpose of associating the mobile device with a user account maintained at the Server. This association between a Bluetooth address and information in the associated user's account e.g., a photo, allows the display of interesting personal information such as a picture (as opposed to simply a Bluetooth address, device type, etc.) among members during discovery, such as depicted in FIG. 5. In this manner members can interact with each other in a way intended to facilitate social interaction, without being limited to only the information made available through existing, hardware independent and limited communication ability as adopted under the Bluetooth standard.

Step 4: To complete installation of the CSA, the server provides the mobile device with a copy of the member's social card and account information. Thereafter, the user may update, replace, revise the social card or personal attribute information, modify, hide or publish profile information (at the server) as contained in the user's contact information, e.g., the information contained in the user's Vcard which may be sent when the user accepts, or a discovered user accepts an invitation to exchange contact information.

Some of the other functions that may be included in the CSA are discussed below. As mentioned above, FIG. 5 illustrates how the Server may associate each mobile device with a member account of the service using a Bluetooth device ID address. During the installation process, the Server may send the CSA to the mobile device and also obtain from the mobile device its unique Bluetooth device ID address (BD_ADDR). Every mobile device with Bluetooth capability has a unique 48-bit address. The installed application sends the Bluetooth address to the server and associates the member with this particular mobile device. Example of an obtained BD_ADDR 48-bit would be: 00:23:7A:04:E2:C4. Alternative user device information can be for instance main component address such as IMEI which is the international Mobile Station Equipment identify.

As known in the art, a Bluetooth-enabled device permits the user to perform an inquiry to find other devices, located within the mobile device's PAN, to be connected to it via the Bluetooth communication standard and configured to respond to inquiries from the requesting user. However, the Bluetooth protocol only provides device name, ID address and/or device class, if requested. Communication between two devices over Bluetooth requires pairing or acceptance by its owner, but the connection itself can be initiated by any device and held until it goes out of range. The initial contact or discovery of another member according to the invention may be established by this standard form of communication. Once contact is made and the Bluetooth device ID address of the discovered user obtained, then personal contact information is received from the network-based service, as explained above, in response to the initial, identifying information about the mobile device. It should be noted that contact among users is not limited to this users within a PAN (personal area network). Rather, users within the vicinity of each other discovered using location-based services or other means can establish contact in the manner described herein.

Referring again to FIG. 5, the Bluetooth standard may be used to accomplish two tasks: First is to obtain a device address. Second, to perform an inquiry utilizing Bluetooth software layers and architecture. After these tasks are complete, all subsequent communications can be facilitated through the server, which may be via a bi-directional method of personal contact information exchange.

As will be understood in light of the disclosure, a bi-directional method for exchange is capable of automating the process of data packet transfer and receipt from both devices reducing the time and human involvement required from both parties to cause the aforementioned processes according to the invention to occur. Thus, in one sense a bi-directional mode of communication may enhance the social experience because it gives the users a sense that the invitation, response and a follow-up exchange (if there is interest) is occurring in near real-time (e.g., as if the devices were actually communicating over a PAN). In the Bluetooth spec, the standard requires that one party is a master and the other party is a slave. All data exchange requires a push and/or pull between the master and slave. A bi-directional method identifies both parties as masters and the exchange is managed from both directions as both parties are communicating to a centralized computer system rather than directly. This bi-directional process can allow the users to process multiple requests through the server without waiting for a single process between two devices that can handle only one push or one pull at a time for example.

It will be appreciated in light of the disclosure that the bi-directional mode of communication method offers the advantage of facilitating an ongoing exchange between mobile device users. That is, the server can receive and send information simultaneously to both users, as opposed to a master-slave type relationship. Thus, in one sense this aspect of the invention may be thought of as providing master-master type communication protocol whereby each mobile device can send and receive information independent of the other mobile device. It will be understood that "master" in this sense does not mean or imply that only a Bluetooth protocol is necessarily contemplated.

Unlike communication using Bluetooth, which is limited by security constraints between paired devices (inherent in the Bluetooth standard), and/or related hardware compatibility issues between mobile devices, all of which are greatly limited in the kinds of information that may be exchanged using standard hardware/software platforms on mobile devices, the invention allows a user to essentially bypass these constraints so that a more personal interaction becomes possible using a standard mobile communication device, such as one equipped with Bluetooth or other protocols for wireless or wired communication. Wireless technologies for this purpose include, but are not limited to, cellular technology, Wi-Fi, Wi-Max, IEEE 802.11 technology, radio frequency (RF) communications, Infrared Data Association (IrDA) compatible protocols, Local Area Networks (LAN), Wide Area Networks (WAN), and Shared Wireless Access Protocol (SWAP), and Personal Area Networks (PAN).

It will be readily apparent that the invention provides a medium for near real-time exchange of contact information, unlike E-mail, SMS or other modes of communication between mobile devices. In this sense the user experience is enhanced over the exchange of E-mail or texting among phones, in at least three ways. First and most obviously, a requesting device is not limited to conversing with only members that he/she can contact through a known e-mail address, phone number, etc. Second, the exchange may proceed simply by initiating discovery and/or responding to a discovery request. Third, the exchange can occur among multiple members of a service at the same time.

Figure 9:
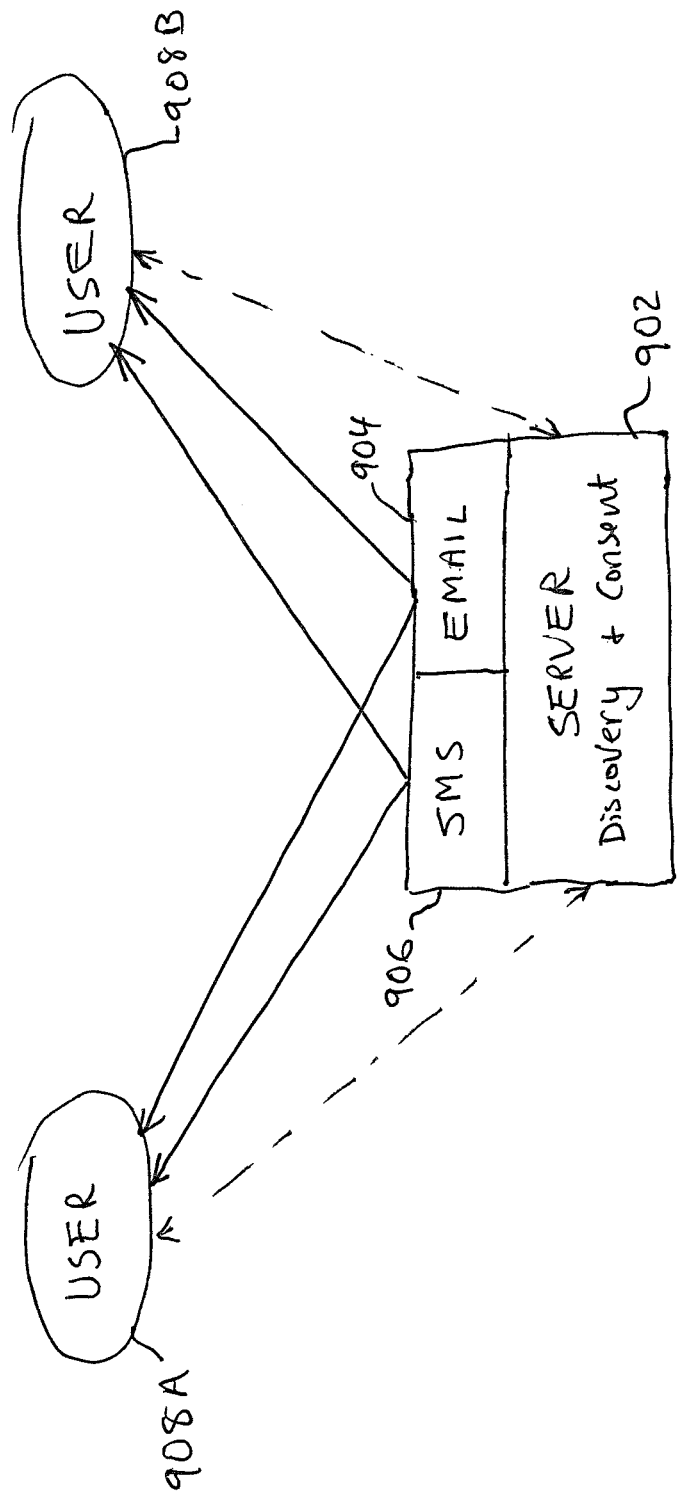
FIG. 9 is depicts establishment of communication between users, such as for example SMS, E-mail, chat/instant messaging, in the form of text or multimedia, video, etc., between consenting users.

Of course once consenting contact has been established between two or more users, other types of communication between them, for example SMS, E-mail, chat/instant messaging, in the form of text or multimedia, video, etc., can also be facilitated. This is depicted in FIG. 9. The centralized computer system ("server") 902 may include, or be associated with, an SMS server platform 904 or E-mail platform 906 that provides a corresponding channel of communication between the users 908A, 908B. The users are shown communicating directly with one another via SMS platform 904 and/or E-mail platform 906, facilitated by server 906.

Figure 6:
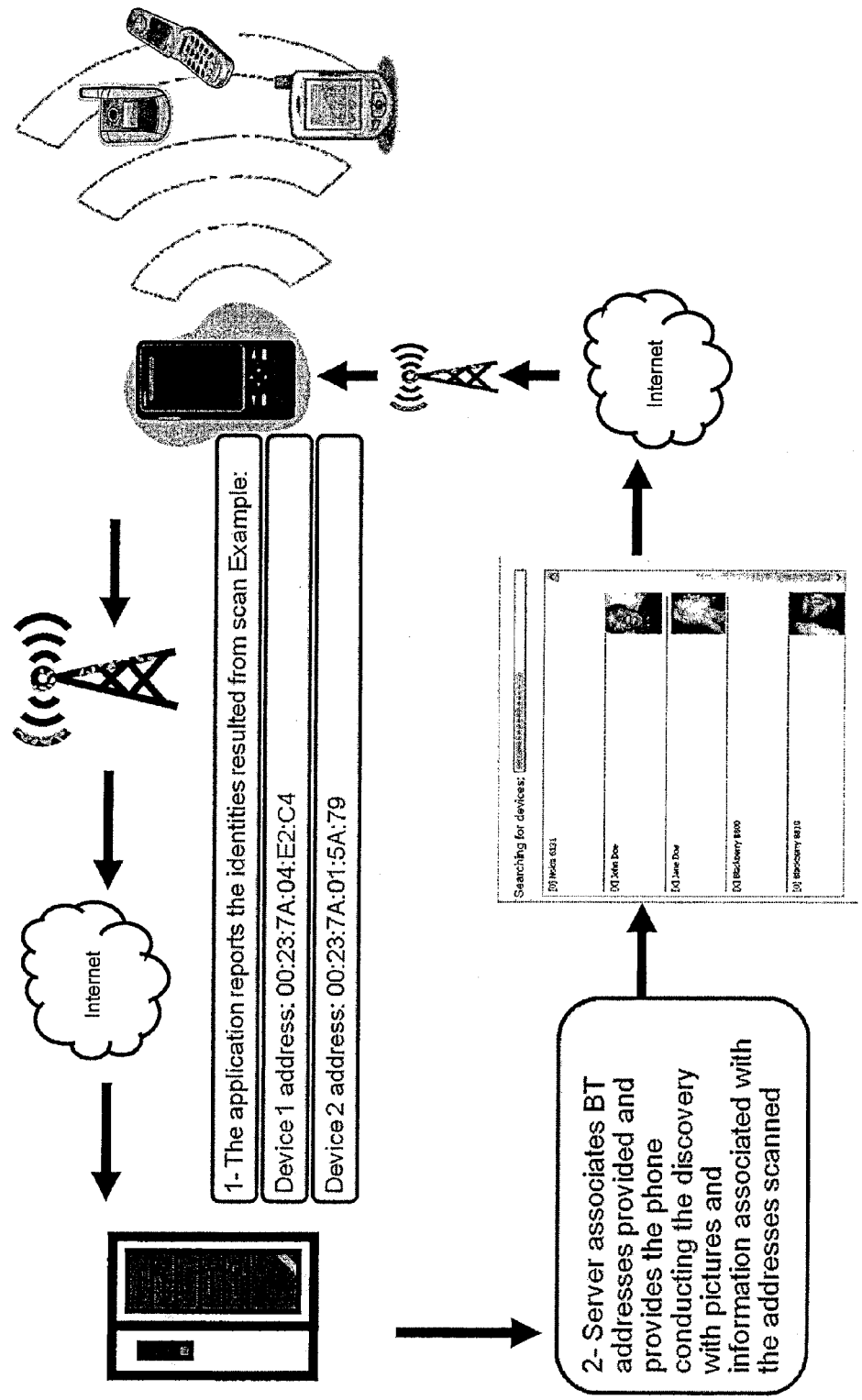
FIG. 6 is a flow chart for a discovery process for associating unique, mobile device identifying attributes, e.g., Bluetooth addresses, with personal attributes between the requesting user and discovered users using information available from the network server. Each mobile device user is a member of the service and has personal contact information accessible through the server.

FIG. 6 illustrates the discovery of the three discovered users from FIG. 5 using the requesting user's mobile device. The requesting user's resident CSA, upon receiving the three respective Bluetooth device ID addresses, i.e., addresses for device 1, device 2 and device 3, (the "addresses" may be broadly construed to include any unique identifier such as a Bluetooth device address, or unique identifier selected from a WiFi address, or main component address or an IMEI which is the international Mobile Station Equipment identify) sends this information to the network server via the cellular phone network. The server, after matching the discovered members' using the uploaded information, transmits back to the requesting user(s) mobile device a picture and name, or other information, for each of the discovered devices, which are then displayed on the mobile device's screen. The discovery process may thus include the showing of personal or intimate information that a member may wish to have displayed during the initial discovery step, rather than merely a device ID or address, device type, etc. At this point the requesting user has received a list of pictures and names which he/she can now select from the mobile device if further contact is desirable.

In one example, in a first step of the discovery process, a user scans the surrounding area covered by Bluetooth short range wireless signal, and obtains all Bluetooth addresses of members in the area. In the second step, the server associates all or some of these Bluetooth addresses with member profiles in the data base (each of which may contain the information described in FIG. 2) and provides the requesting user conducting the discovery with the results of the discovery in the form of personal attributes of nearby members including their pictures and names, which may be a social card for each of the members of the service. If a device address is not associated with a member of the service, the Server will report to the user conducting the discovery that the address as "Unknown" or provide generic information such as the device class or device name per Bluetooth standards.

Figure 7:
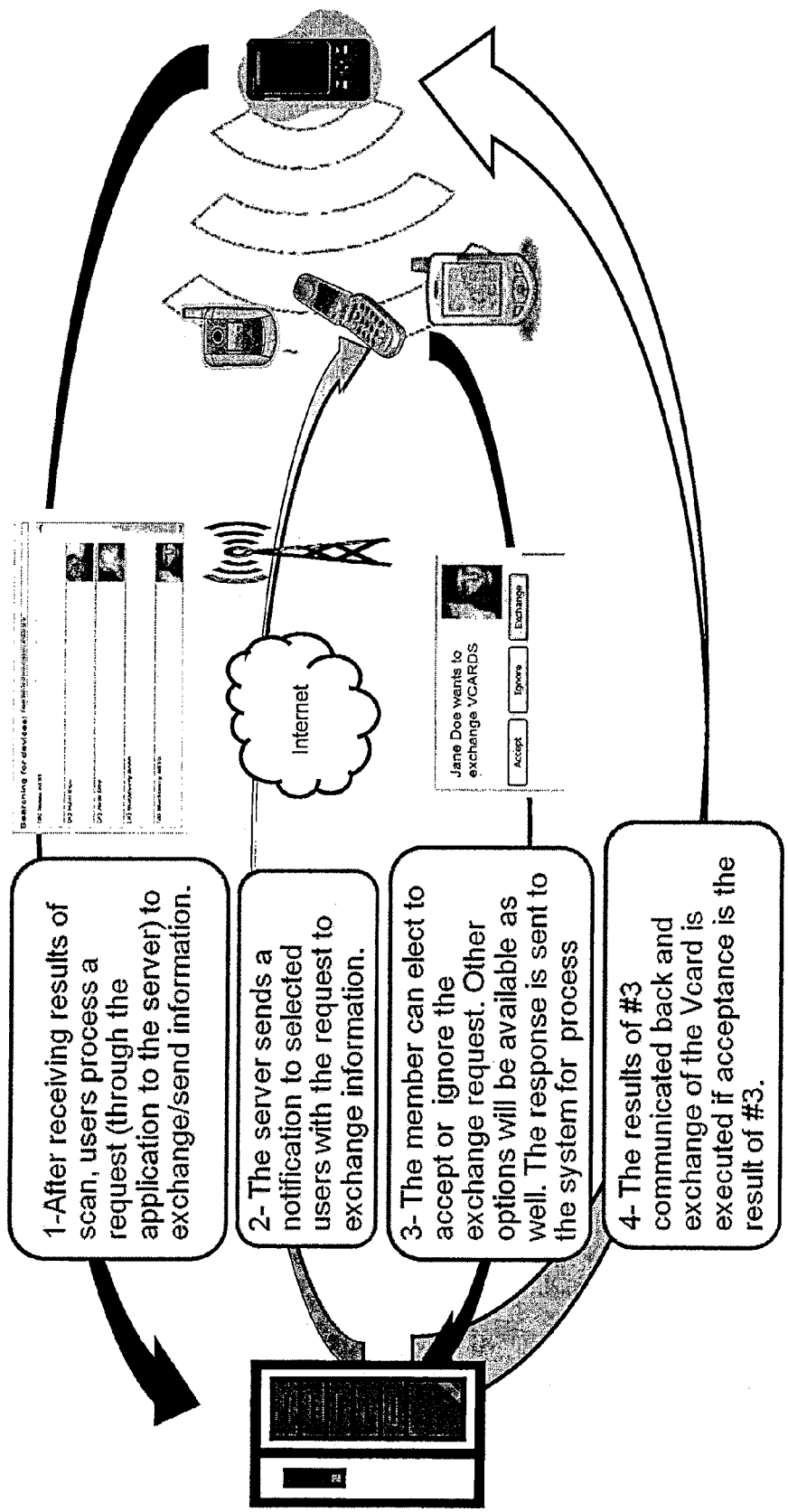
FIG. 7 is a flow chart depicting the processing of the requesting user's request to exchange information with the discovered users. In this example Jane Doe has selected one of the three discovered users after receiving the results of the scan, i.e., pictures and names of everyone within the discovery range, e.g., PAN, of Jan Doe's mobile device.

FIG. 7 shows in further detail how users may discover each other, in four steps:

Step 1: The results of a discovery are provided to the requesting user, who receives personal attributes including pictures and names of four other discovered users. Four is not a limit and greater numbers of discovered users is contemplated. The requesting user (User #1) selects the one or more of the discovered users from the list (using functions available through the CSA) that he wishes to exchange contact information with. This request is received by the CSA, such as through the mobile device's touch-sensitive screen for selecting one or more displayed social cards or icons displaying a discovered user's picture and name (e.g., as shown in the drawings). Once the mobile device user selects one or more discovered users by screen, keypad, mouse, pen, etc., the CSA can then initiate automatic access information to the Server. Form this point, the server proceeds to distribute the social card or other information to the selected discovered user(s). The distributed social card or other information can be preset, and/or it can be controlled by the discovering user during the instant session.

Step 2: The Server receives the request from User # 1 CSA, which in this case is a request to exchange or send contact information to User # 2(and/or # 3, 190 4, etc). The Server sends a notification to User # 2 (and/or # 3, # 4) alerting her of User #1's request to exchange personal contact information. This alert is sent in the form of User # 1's custom social card providing personal attributes (including name and picture) and requesting User # 2 to either accept, ignore or exchange contact information.

Step 3: User # 2 informs the server with her choice of accepting, ignoring or exchanging contact information. This command, like the others issued by User # 2, is processed by the CSA on the User # 2 mobile device which engages in a two way communication with the Server via internet protocol for example.

Step 4: If the choice selected by User # 2 is exchange contact information, User # 2 will receive User # 1's customized social card. The CSA on User # 2's device obtains this information from the Server via the internet protocol. The information may be received in the form of Vcard and stored in User # 2's local, mobile device resident address book as well stored under User # 2's account in the Server's database. User # 1 can receive User # 2's customized social card in the same manner and the contact information may also be stored in User # 1's local, mobile device resident address book as well as stored under User # 1's account at the Server's database. If User # 2's choice was "ignore", then the CSA may send, via the internet protocol a rejection notification to User # 1. This may be in the form of an alternative customized social card for User # 2, or simply by a text message rejection. The third choice, "accept", causes the CSA on User # 2's mobile device to receive User # 1's information only, but not send her card in exchange.

The communication between the Server application and CSA are conducted via common standards such as HTTP (A protocol used to request and transmit files, especially WebPages and webpage components, over the Internet or other computer network). Communication between the CSA and Server may utilize the well known XML format (A metalanguage written in SGML that allows one to design a markup language, used to allow for the easy interchange of documents over the World Wide Web).

Figure 8:
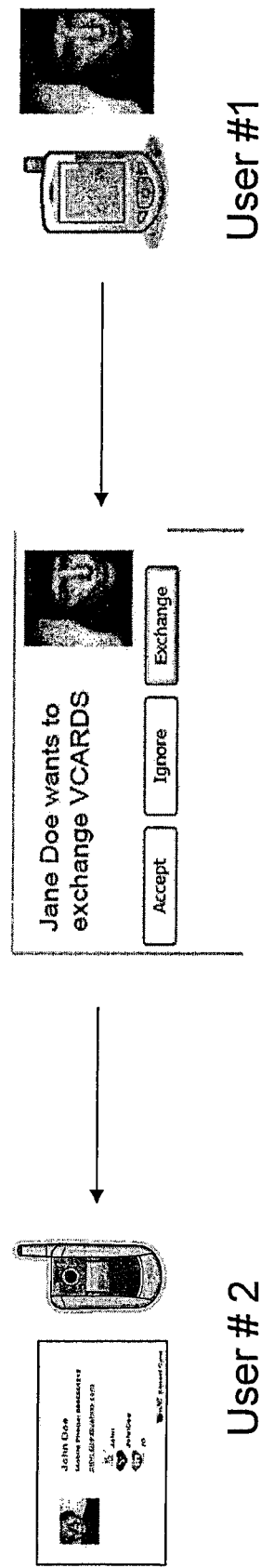
FIG. 8 describes additional aspects of notifications and responses to requests for exchange of electronics coordinates, or personal information from FIG. 7.

FIG. 8 shows a further example of notification to discovered users alerting them to an exchange request. The notification shows other users' personal attributes including name and photo.

The server database may store any contact information exchanged and add it through a synchronization method with the client side application on the mobile device address book, if the user elects to store the information locally.

In other embodiments, the invention may be practiced using other short range wireless communication protocols such as WiFi or WiMax in lieu of Bluetooth if the mobile devices have chipsets that support such a wireless signal, as described above.

Associating the mobile device using Bluetooth information as described in connection with FIGS. 3, 5 and 6 may, in alternative embodiments, be accomplished with GPS (Global Positioning System) information association subject to ability to locate devices and associate them by location of cellular towers or chipsets.

Figure 10:
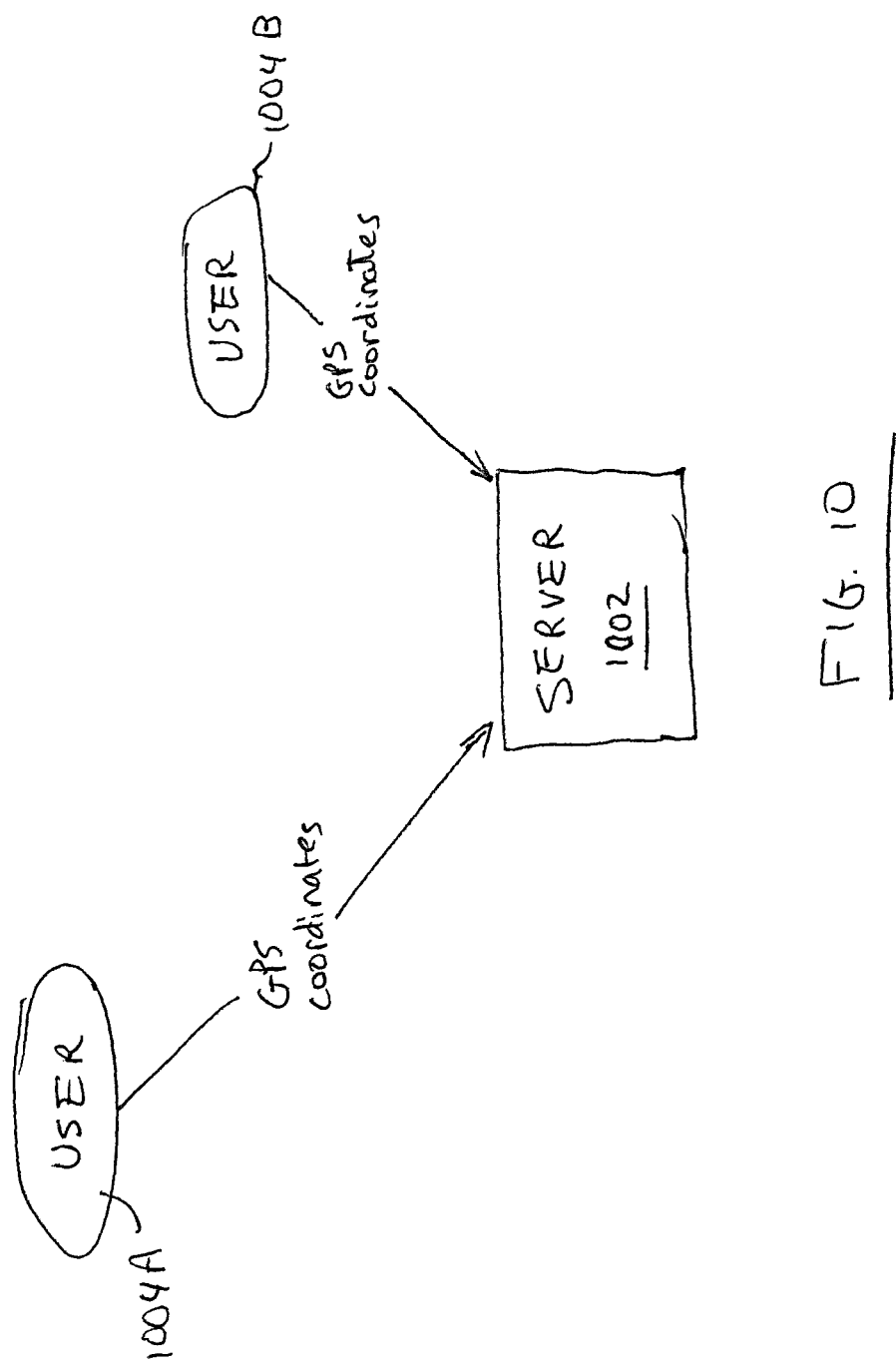
FIG. 10 depicts an arrangement in which a server receives GPS coordinates from users, compares these coordinates to determine proximity, and informs the users of the proximity.

In certain embodiments, the server can track locations of participating members, and report these locations to nearby members. Location tracking can be based on GPS and/or WiFi or other known protocols. In this manner, members who are not Bluetooth-enabled, or outside of Bluetooth or short range wireless signal can still be discovered and connected to other members who are close by. FIGS. 4 and 10 depict such an arrangement, wherein server 1002 (FIG. 10) is shown receiving GPS coordinates from Users 1004A and 1004B, comparing these coordinates to determine proximity, and informing the users of the proximity. Informing one user of another's proximity can be contingent upon consent of the users, as obtained above, and can be performed in gradations, for example initially sending limited information of one user to another, then increasing the delivered information and establishing contact depending on consent. In certain embodiments, the participating members report their locations to the server, for example periodically, and the server maintains a record of and updates these reported locations, and provides reports to certain users, for examples to those belonging to a common social network. User profiles of users who are connected can be updated to reflect this information by the server/computing device.

In certain embodiments, the CSA, residing on the mobile device, may have the following software functionality.

An "Authentication" portion requests authentication parameters from a user (ID or user login name and password); connects to an instance of server; sends user authorization information to the server side using ID or user name and password; displays a reason for denied access in case of incorrect login; and exits from the software in case of a preset number of incorrect logins; allows a user to change the password; and downloads profile information from the server.

A "Synchronize" portion retrieves a list of contacts from the server (getCard?cmd=all) and stores contents of the result set to the local address book (create new contacts and update existing contacts); periodically retrieves the list of pending and changed contacts from the server (udateCard?cmd=pending and getCard?cmd=changed) and stores contents of the result set to the local address book (create new contacts and update existing contacts); and scans the local address book for changes and new entries and sends those changes to the server.

Optionally, the service may connect to another social network database through APIs, which are application programming interfaces, to access other social network users attributes such as name and picture.

The methods of connecting and application programming interface would differentiate from one social network to another and be proprietary to the respective social networks. An application programming interface (API) is a set of routines, protocols, and tools for building software applications.

An API expresses a User Attributes such as name, picture and any additional information on the user. The API expresses as well the social network operations, inputs, outputs, and underlying types.

A "Bluetooth Exchange Contacts" portion allows a user to discover devices with the application installed nearby by Bluetooth; for the devices in which a client application is resident download limited information (name, title) and a picture; display the list of found Bluetooth devices with mentioning if a device from the list has a CSA running or not; allow a user to select devices from the list of found devices (one or multiple); allow a user to initiate the sending of his contact information, e.g., social card, to the selected devices; Send the user's profile to the selected device(s): If the CSA is running on the device then send the profile as profile including ID and picture; if a CSA is not installed or running on the device then send the profile as a VCARD (text/vcard MIME type); listen for inbound connections from clients; accept requests for brief information. Additionally, this module sends a partial contact information in response to a request; accepts requests for card exchange; ask a user for confirmation/send user confirmation back; accepts contact information and stores it locally; and sends own contact information.

Figure 11:
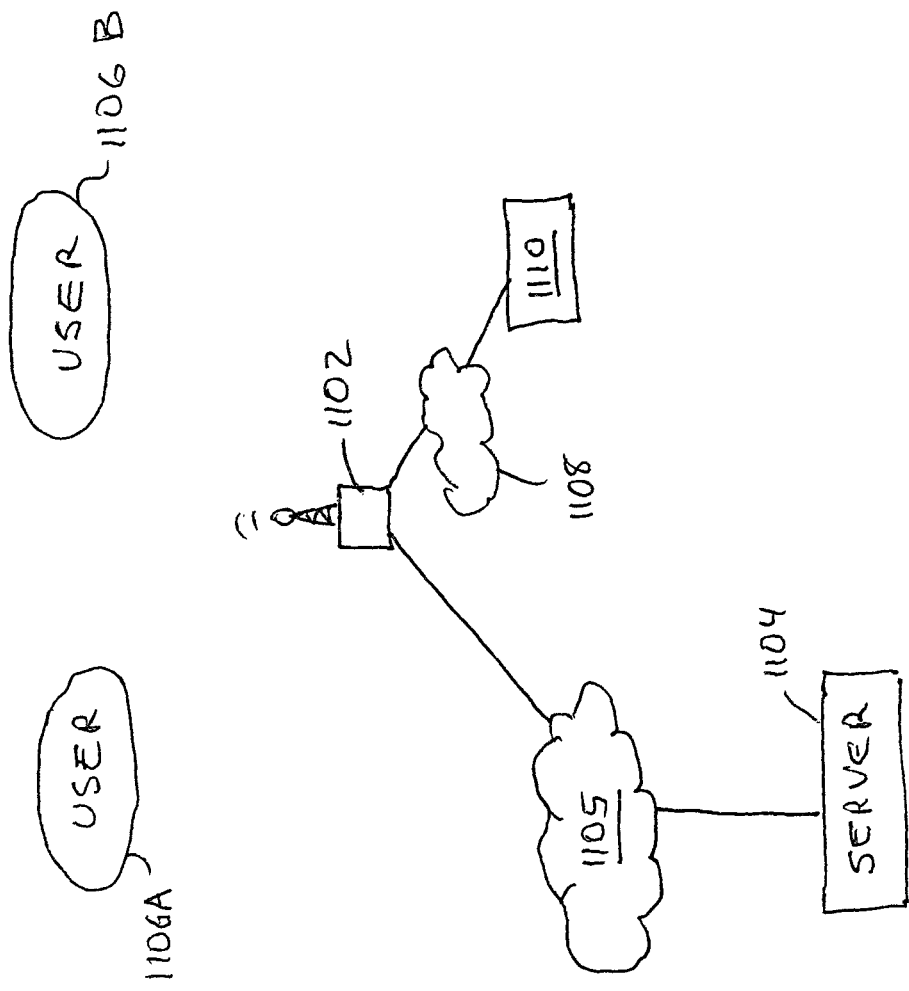
FIG. 11 depicts an arrangement relating to a process of ad hoc discovery of members between a mobile device and a discovery device that is capable of connecting via short range and connected to the network via Internet enabling technology wired or wireless.

In certain embodiments, the process of ad hoc discovery of members can be between a mobile device and a discovery device that is capable of connecting via short range and connected to the network via Internet enabling technology wired or wireless. Such an arrangement is shown in FIG. 11. The discovery device 1102 can be planted at a particular location—for example a convention center—and coupled wirelessly or by wireline to the computing device/server 1104, for example through a network 1105. The reporting device 1102 operates to discover users 1106A, 1106B who are in the vicinity, and report same to the computing device/server 1104. The computing device/server 1104 can then send users (1106A, 1106B) who were discovered in the vicinity short text message or multimedia message informing them of the presence of each other. The discovery device 1102 can connect through wireless or wired communication methods, potentially through a network 1108, to additional devices 1110 to execute functions based on the detected users of the network in the vicinity. Such functions can be based on user preference, and include "network of things" functionality, such as turning lights on or off, controlling thermostats to adjust temperature, locking or unlocking doors, and similar remote object control.

Figure 12:
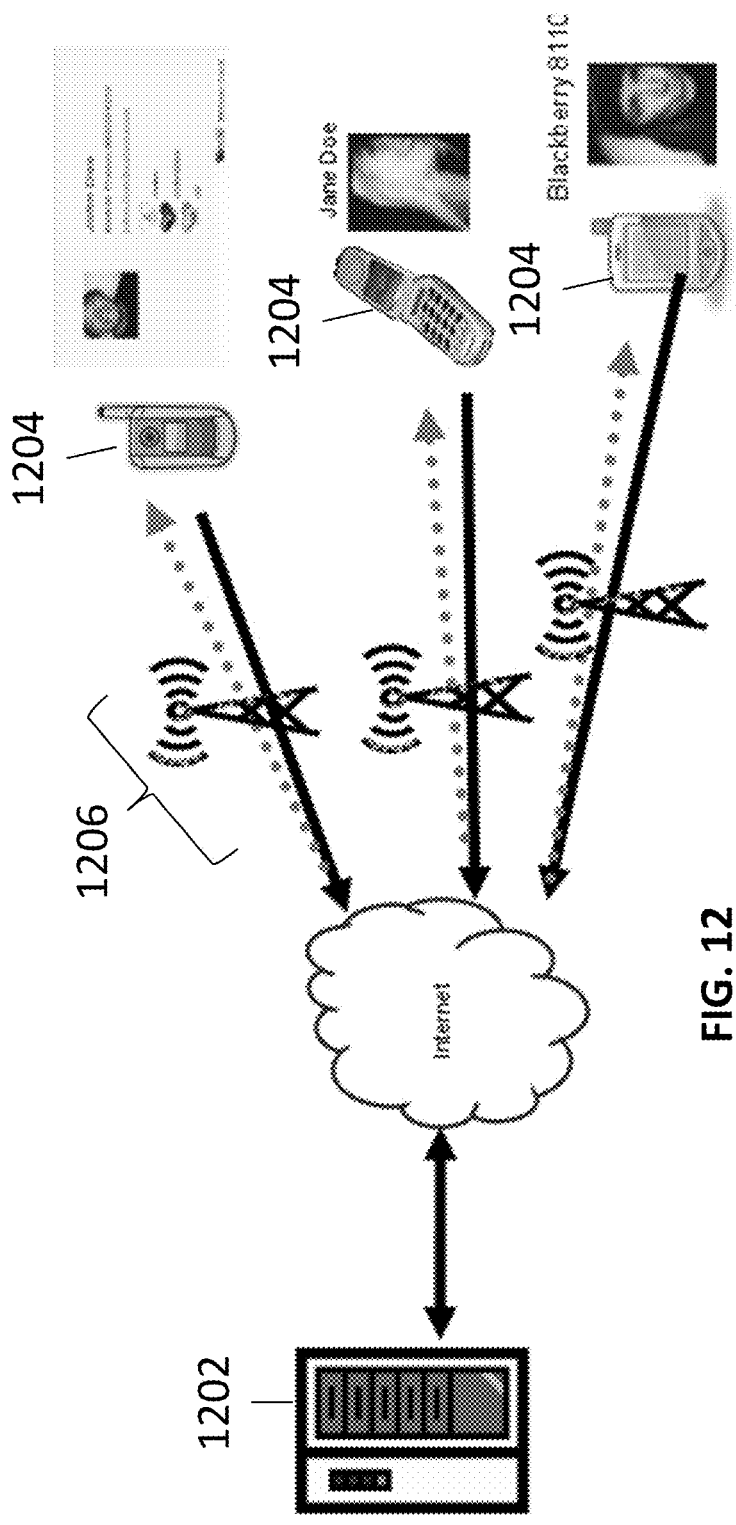
FIG. 12 is directed to an arrangement in which a server/computing device 1202 communicates bi-directionally with user devices 1204 by way of a cellular base transceiver station (BTS) 1206 through a standard that also provides separate facilities (not shown) for transmission of digital data.

FIG. 12 is directed to an arrangement in which server/computing device 1202 communicates bi-directionally with user devices 1204 by way of a cellular base transceiver station (BTS) 1206 through a standard that also provides separate facilities (not shown) for transmission of digital data. Server 102 is capable of offering services to the users associated with devices 1204, who may be members a social networking service, such as ability to chat with each other after discoverability, or exchange emails. The users/members can report their geographical position to the server/computing device 1202, and which is capable of reporting to other members the personal attributes, for example from the social network, of other members in the vicinity or beyond.

Figure 13:
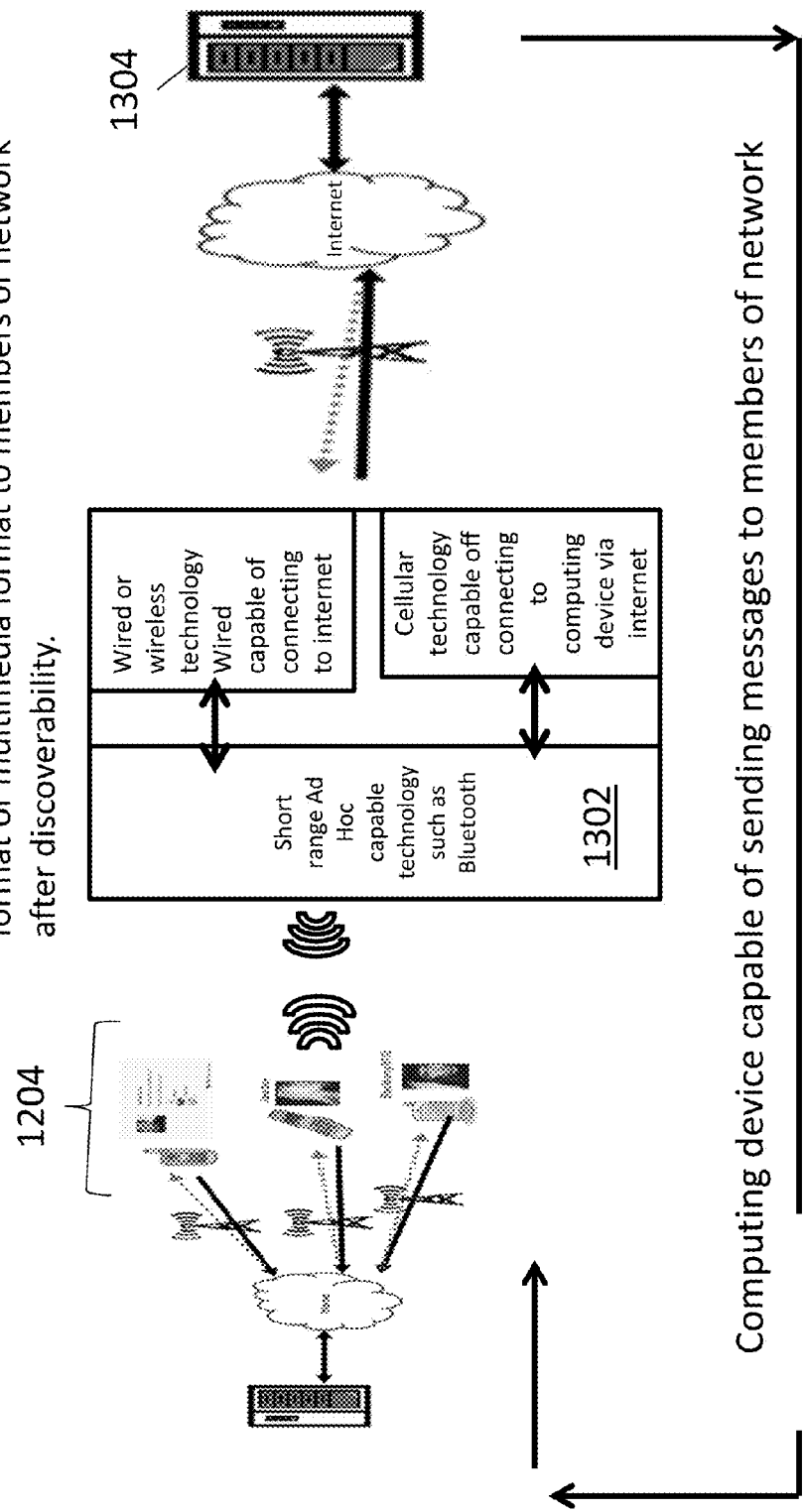
FIG. 13 is directed to a system and method of discoverability by a device other than the mobile devices of members in vicinity and identifying them by social and personal attributes.

FIG. 13 is directed to a system and method of discoverability by a device other than the mobile devices of members in vicinity and identifying them by social and personal attributes. In FIG. 13 a device 1302 is equipped with short range ad hoc capable technology, such as Bluetooth, and discovers users/members 1204 of a social network. This is communicated to server/computing device 1304, which is capable of sending messages, for example in text format or multimedia format to discovered users/members 1204. Device 1302 may also be equipped with wired or wireless technology to be capable of connecting to the internet, and/or cellular technology capable of connecting to server/computing device 1304 via internet.

Figure 14:
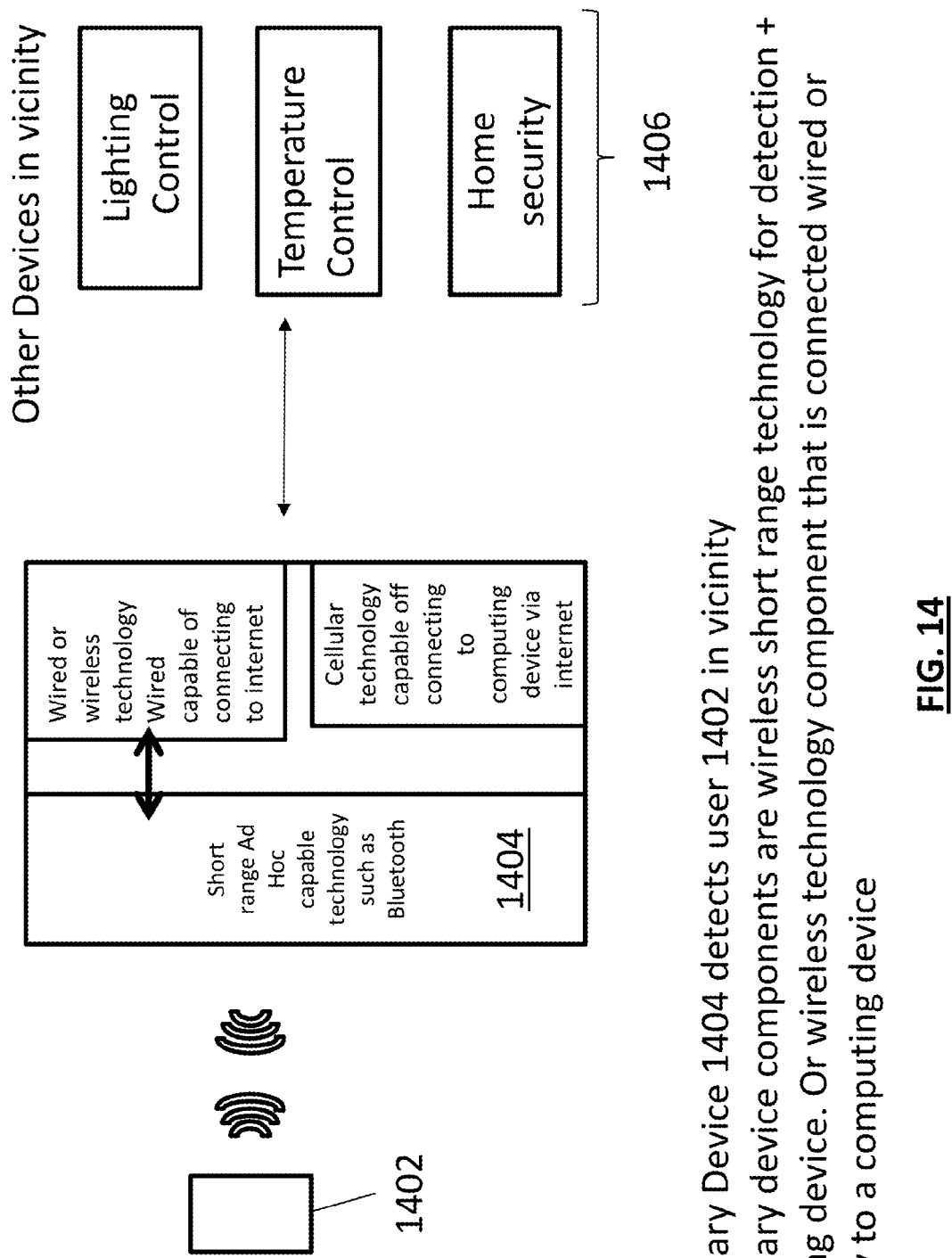
FIG. 14 is directed to system and method in which a user/member 1402 is shown connected, via an ad hoc network, to a device 1404 equipped with short range ad hoc capable technology, such as Bluetooth.

FIG. 14 is directed to system and method in which a user/member 1402 is shown connected, via an ad hoc network, to a device 1404 equipped with short range ad hoc capable technology, such as Bluetooth. Device 1404 may also be equipped with wired or wireless technology to be capable of connecting to the internet, and/or cellular technology capable of connecting to other devices 1406, for example via internet.

Figure 15:
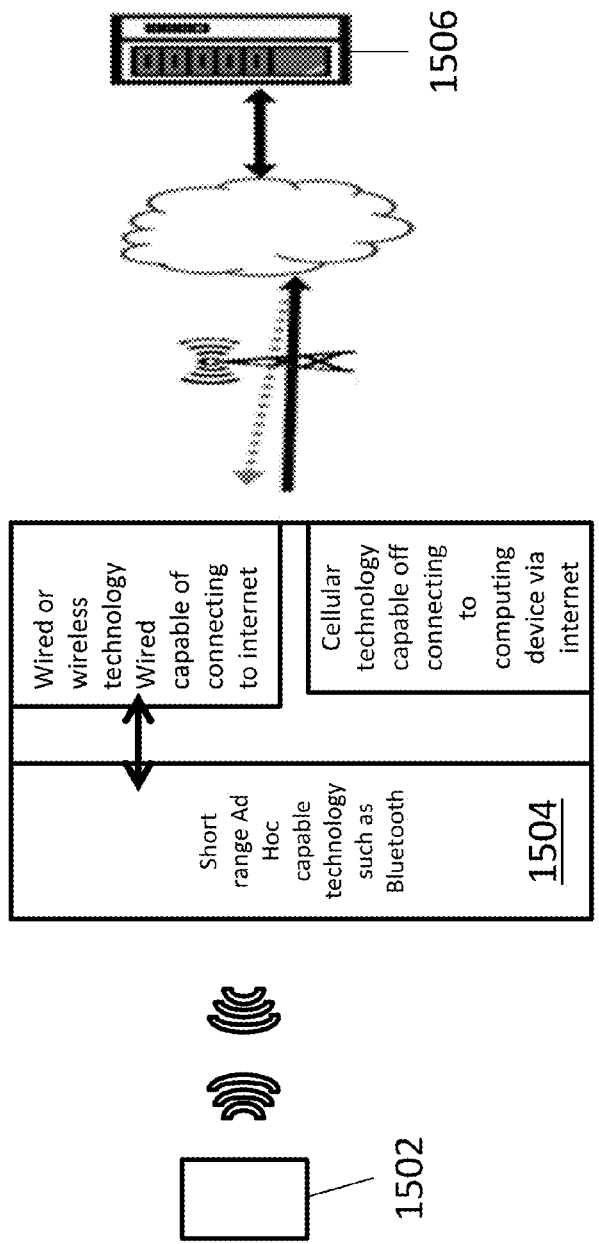
FIG. 15 is directed to system and method in which a user/member 1502 is shown connected, via an ad hoc network, to a device 1504 equipped with short range ad hoc capable technology, such as Bluetooth.

FIG. 15 is directed to system and method in which a user/member 1502 is shown connected, via an ad hoc network, to a device 1504 equipped with short range ad hoc capable technology, such as Bluetooth. Device 1504 may also be equipped with wired or wireless technology to be capable of connecting to the internet, and/or cellular. Device 1504 is connected to sever 1506 via wireless signal to report the presence of user/member 1502.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

The invention claim is:

1. A system comprising:
a computing device configured to allow communication between a plurality of members of a social network for any of connecting through said social network and exchanging personal information between a first user and a second user, the first user using a respective first mobile communications device and the second user using a respective second mobile communications device each operatively connected to any of a mobile telecommunications provider network and an internet connection to access said computing device;

the computing device in communication with said first user and said second user through said first mobile communications device and said second mobile communications device, wherein said computing device connects said first mobile communications device and said second mobile communications device to the internet using any of the mobile telecommunications provider network and a Wi-Fi connection;

the computing device configured to provide access to stored user profile information relating to said first user and said second user, respectively, wherein said stored user profile information comprises any of a picture, name, and location of a respective user;

the computing device configured to receive an inquiry from said first user about members in said social network who are close by in proximity to a current location of said first user to permit connection through said social network and for exchanging contact information between the users;

the computing device configured to return said inquiry by providing a user profile information of said members, wherein said user profile information comprises attributes comprising any of a picture, name, and location of a respective member, and wherein said computer device reports to said first user said attributes of all members who are close by in proximity to said current location of said first user;

the computing device configured to receive information identifying locations of the first user and cross reference with any of a location of said second mobile communications device, and locations of multiple users that are close by in proximity to said current location of said first user;

the computing device configured to receive a unique device hardware identifier from each mobile communication device from each linked member in said social network to associate and link to a respective member profile to authenticate said respective member as a linked member;

the computing device configured to determine proximity of the locations of the first and second mobile communication devices and other communication devices of other users to one another and to send to the second mobile communications device an invitation to connect to said first user or accept personal attribute information, or share personal attribute information with, the first user;

the computing device configured to provide services between users for personal communication, the personal communication comprising services including one or more of SMS, E-mail, chat/instant messaging, multimedia, voice, or video; and the computing device configured to provide personal attributes comprising any of a picture, name, and location of members in a vicinity of one another to permit connections and exchange of contact information between said members, wherein the first and second users are members of a same social network, and the computing device is operable to disclose social network attributes including a picture, name, and location of first and second users in the vicinity or within a particular distance from one another for the purpose of connecting members.

2. The system of claim 1, wherein the computing device is operable to provide any of the first and second user with social network attributes including pictures, names, location, and location proximity of all users in the social network in the vicinity or close by in proximity to any of the first and second user.

3. The system of claim 1, wherein the computing device is configured to receive an inquiry from the first user about other members of said social network who are close by in proximity to the first user.

4. The system of claim 1, wherein the computing device is configured to report to the first user social network attributes including pictures, names, and locations of all members of the social network who are close by in proximity to the first user.

5. The system of claim 4, wherein the computing device is configured to receive from the first user a selection of one or more additional users with whom the first user wishes to any of connect with through said social network and exchange social attributes.

6. The system of claim 5, wherein the computing device is configured to send to the first user social attributes such as a picture, name, and location of one or more of the selected additional users.

7. The system of claim 5, wherein the computing device is configured to obtain the permission of the selected additional users prior to said sending contact information or personal attributes or connecting members through said social network when user permission is required.

8. The system of claim 1, wherein the computing device is configured to update the profile information to indicate that the first and second users are connected.

9. The system of claim 1, wherein the computing device is configured to update the profile information to indicate that the first and second users are connected.

10. A method comprising:

providing, via a computing device, accessible through any of an internet connection and a mobile telecommunications provider network, access to stored user profile information about a first user using a respective first mobile communications device and a second user, using a respective second mobile communications device;

receiving, via the computing device, indications of the locations of the first and second mobile communications devices;

receiving, via the computing device, a unique device hardware identifier from all communications devices from all users linked in a social network to associate with profiles and authenticate when users sign in to a user account;

sending, via the computing device, to the second mobile communications device, an invitation to accept any of an invitation to connect and personal attribute information from, or share personal attribute information with, the first user, upon receipt of permission from the second user to receive personal attribute information about, or share personal attribute information with, the first user; and connecting, via the computing device, the first user and the second user through the computing device for personal communication between first user and the second user, the personal communication comprising one or more SMS, E-mail, chat/instant messaging, multimedia, voice or video, wherein the computing device is configured to locate information about the second user from a social network file of the second user, and transmit this information to the first mobile communications device, and wherein the first and second users are members of a same social network, and the computing device is operable to disclose social network attributes such as a picture, name, and a location of first and second users in the vicinity or within a particular distance from one another for the purpose of connecting members.

11. The method of claim 10, wherein the computing device is operable to provide the first and/or second user with social network attributes such as a picture, name, and location of all users in the social network in the vicinity or close by the first and/or second user.

12. The method of claim 10, wherein the computing device is configured to receive an inquiry from the first user regarding other users in the social network in proximity to a location of the first user.

13. The method of claim 10, wherein the computing device is configured to report to the first user social network attributes including a picture, name, and location of all members of the social network who are close by in proximity to the first user, and wherein the computing device is configured to provide personal attributes comprising any of a picture, name, and location of members in a vicinity of one another to permit connections and exchange of contact information between said members.

14. The method of claim 13, wherein the computing device is configured to receive from the first user a selection of one or more additional users with whom the first user wishes to any of exchange social attributes and connect with.

15. The method of claim 14, wherein the computing device is configured to send to the first user social attributes of one or more of the selected additional users.

16. The method of claim 14, wherein the computing device is configured to obtain permission of the selected additional users prior to said sending.

17. The method of claim 10, wherein the computing device is configured to update the profile information to indicate that the first and second users are connected.

18. The method of claim 10, wherein the computing device is configured to update the profile information to indicate that the first and second users are connected.

19. The method of claim 18, wherein the computing device reports a location of users by determining a proximity of said users to other users based on original location information entered during an initial registration process.

20. A non-transitory machine readable medium storing instructions that, when executed by a computing device, cause the computing device to perform a method, the method comprising:

providing, via a computing device, accessible through any of an interne connection and a mobile telecommunications provider network, access to stored user profile information about a first user using a respective first mobile communications device and a second user, using a respective second mobile communications device;

receiving, via the computing device, indications of the locations of the first and second mobile communications devices;

receiving, via the computing device, a unique device hardware identifier from all communications devices from all users linked in a social network to associate with profiles and authenticate when users sign in to a user account;

sending, via the computing device, to the second mobile communications device, an invitation to accept any of an invitation to connect and personal attribute information from, or share personal attribute information with, the first user, upon receipt of permission from the second user to receive personal attribute information about, or share personal attribute information with, the first user; and connecting, via the computing device, the first user and the second user through the computing device for personal communication between first user and the second user, the personal communication comprising one or more SMS, E-mail, chat/instant messaging, multimedia, voice or video, wherein the computing device is configured to locate information about the second user from a social network file of the second user, and transmit this information to the first mobile communications device, and wherein the first and second users are members of a same social network, and the computing device is operable to disclose social network attributes such as a picture, name, and a location of first and second users in the vicinity or within a particular distance from one another for the purpose of connecting members.

* * * * *